Dec. 8, 1925.

J. B. TOPHAM 1,564,725

EMERGENCY BRAKE OPERATING DEVICE

Filed Nov. 4, 1924

WITNESSES
C. R. Halbert
J. Herbert Bradley.

INVENTOR
James B. Topham,
By
Winter, Brown & Critchlow
His Attorneys

Patented Dec. 8, 1925.

1,564,725

UNITED STATES PATENT OFFICE.

JAMES B. TOPHAM, OF PITTSBURGH, PENNSYLVANIA.

EMERGENCY-BRAKE-OPERATING DEVICE.

Application filed November 4, 1924. Serial No. 747,779.

*To all whom it may concern:*

Be it known that I, JAMES B. TOPHAM, a citizen of the United States, and a resident of Pittsburgh, in the county of Allegheny and State of Pennsylvania, have invented a new and useful Improvement in Emergency-Brake-Operating Devices, of which the following is a specification.

This invention relates to a brake operating mechanism, and particularly to one for use in connection with the emergency brake system of a motor vehicle.

It is an object to provide an emergency brake operating means which is simple in construction, durable and efficient, which will not easily get out of order, which can be readily applied to vehicles already in use or furnished as a part of their initial equipment.

It is a special object to provide a brake operating mechanism which is mounted upon the dash of the vehicle so as to eliminate all such means as levers projecting upwardly through the floor as are now in common use, thus leaving the space between the seat and dash free of obstructions and eliminating the dangers incident to the positioning of brake levers at this point. It is well known that such levers are frequently obstructed by the feet and legs of persons crowded in beside the driver, or by packages falling behind the lever, being not only a source of annoyance but frequently occasioning danger in the control of the machine. By using the brake actuating mechanism of this invention in conjunction with gear shifting devices lacking the usual gear shift lever projecting upwardly through the floor, substantially the entire space between the front seat and the dash is left unobstructed.

It is also a special object to provide a brake operating means of the character referred to which is adapted to positively hold the brakes in locked condition when applied but which can be easily and quickly released whenever desired.

Another special object is to provide an emergency brake operating mechanism having a movable body which serves as a housing for the locking parts employed and at the same time is so associated therewith as to be guided thereby.

These and other objects of the invention will more fully appear when taken in conjunction with the following description and the appended claims.

Figure 1:
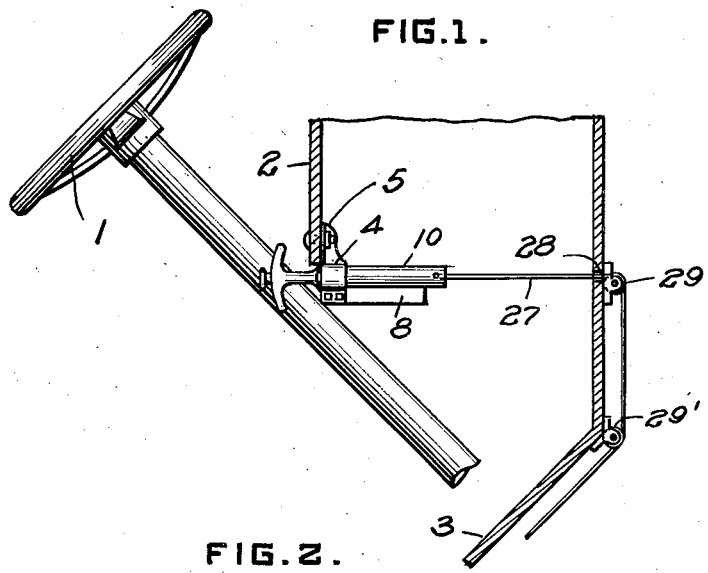
Figure 2:
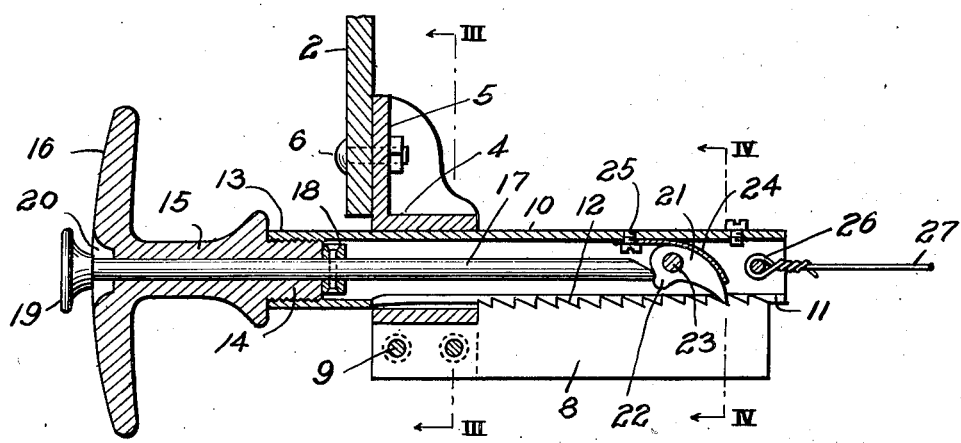
Figure 3:
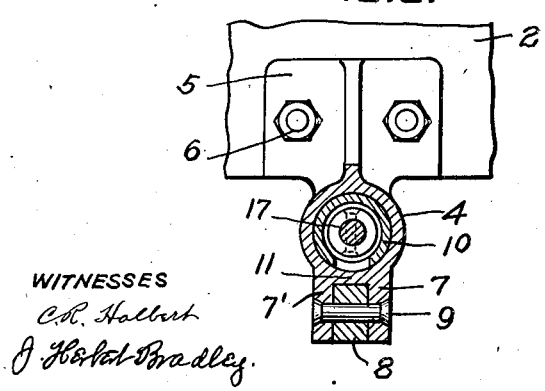
Figure 4:
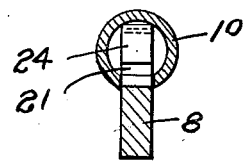

In the accompanying drawings, Fig. 1 is a fragmentary view, partially in section and partially in elevation, of the dash portion of an automobile showing the method of attaching the brake operating means in place; Fig. 2 a vertical sectional view with parts in elevation, on an enlarged scale, showing the detailed structure of the brake operating means; Fig. 3 a transverse vertical section taken substantially on the line III—III of Fig. 2; and Fig. 4 a similar view taken on the line IV—IV of Fig. 2.

The steering wheel of the vehicle is indicated at 1, and the dash and front portion of the floor thereof at 2 and 3, respectively. A socket guide bearing 4 is mounted directly upon the dash board 2, being provided at its upper side with a flanged portion 5 for this purpose, a bolt 6 passing through apertures formed in the dash and flange. The lower part of the bearing socket is equipped with a pair of spaced depending flanges 7, 7' between which one end of a rack bar 8 is adapted to be anchored. The rack bar is attached to the flanges 7, 7' by means of a plurality of bolts or rivets 9 passing through aligned openings in the flanges and rack bar.

Mounted for bodily sliding movement within the bore of the bearing socket 4 is a hollow tubular body 10 which is provided with an open slot 11 upon its lower side, this slot extending throughout nearly the entire length of the body, and into which the toothed edge 12 of the rack bar is adapted to project when the body is operatively mounted within the bearing socket, as clearly shown in Fig. 2 of the drawings.

The bore of the body 10 is internally threaded at one end as indicated at 13 for engagement with the threaded extremity 14 of a tubular handle 15 provided with the flanged portion 16 formed in the nature of a hand-grip. By threading the portion 14 into the open end of the tubular body 10, the handle is rigidly but detachably connected thereto. Slidably mounted and guided within the bore of the handle 15 is an actuating rod 17, the intermediate portion of the rod being provided with an abutment 18 adapted to contact with the inner face of the handle, and is also equipped with a removable knob 19 at its outer extremity, the knob 19 being preferably threadedly engaged with the end of the rod. The knob 19 also serves as an abutment spaced from the abutment 18, and these abutments are so related as to permit a predetermined limited longitudinal movement of the actuating rod. The face of the hand grip 16 is recessed immediately surrounding its longitudinal bore as at 20, the shape of this recess conforming to that of the knob 19 and into which the knob is adapted to seat when the actuating rod is forced inwardly.

Adjacent the end of the tubular body opposite the handle 15, and mounted within the bore of the body is a rocking dog 21 having the lug 22 formed thereon. This dog is mounted upon a pin 23 extending between the sides of the tubular body. The dog 21 is of such dimensions that its nose may project through the slot 11, into contact with the teeth of the rack bar 8, and the dog is constantly urged towards the rack bar by means of a leaf spring 24 fixed upon the interior of the body 10 by means of the screw 25. The inner extremity of the actuating bar 17 is adapted to contact the lug 22 on the dog, and the abutment 18 is so disposed as to contact with the handle when the nose of the dog is fully engaged with the teeth 12, but to limit movement therebeyond, and the abutment knob 19 is spaced from the abutment 18 so as to permit the actuating rod 17 to be bodily moved sufficiently to withdraw the dog entirely free of the teeth of the rack bar whenever desired.

A transverse pin 26 is fixed to the tubular body 10 adjacent the end opposite the handle 15. One end of a cable 27 is fastened to the pin 26 and extends through a suitable opening 28 in the dash of the machine, and is twined over the guiding sheaves 29, 29'. The opposite end of the cable 27 is attached to any suitable portion of the brake system so as to actuate the same. The particular brake system employed forms no part of the present invention it being obvious that the operating means described may be used in connection with numerous brake systems now in common use.

Due to the fact that the rack bar 8 projects inwardly through the open slot 11 of the tubular body, the said body is positively held against turning movement while at the same time having free longitudinal bodily movement within the bearing socket 4. The rack bar substantially fills the entire slot thus cooperating with the body 10 to form in effect a closed housing, the dog and the actuating rod, together with the several parts used in connection therewith, being entirely housed within the bore of the tubular body.

In operation, in order to apply the brakes, it is merely necessary to grasp the gripping portion 16 of the tubular handle 15 and draw the same towards the left, as viewed in Figs. 1 and 2 of the drawings. This moves the tubular body 10 within its bearing socket 4 and exerts the necessary tension upon the cable 27 to apply the brakes. Free bodily sliding movement of the body 10 is permitted, the dog 21 riding freely over the teeth of the rack bar during movement in this direction. The dog, however, prevents return movement, thus positively locking the brakes after they have been applied.

In order to permit the body 10 to move towards the right, for releasing the tension upon the cable 27 and the brakes, it is merely necessary to apply sufficient pressure upon the knob 19 to force the actuating rod 17 inwardly to withdraw the dog 21 from the teeth of the rack bar, in an obvious manner. After the dog has been withdrawn from the rack bar, the tubular body 10 may be moved inwardly or towards the right to the desired extent to fully or partially release the brakes, and can be locked in any set position by releasing pressure upon the knob 19 to again permit the dog to engage the rack bar.

By mounting the brake operating means directly upon the dash 2, substantially the entire space between the front seat of the vehicle and the dash is left entirely free. This brake operating means is particularly intended for use in conjunction with any type of gear shifting mechanism not employing a gear shift lever projecting upwardly through the floor in front of the driver's seat, and when the two devices are thus used, the entire space in front of the driver's seat is left unobstructed.

It is thus seen that the invention provides a comparatively simple construction which can be readily applied to vehicles already in use, in which substantially all of the working parts are effectively housed, which will effectively lock the emergency brakes after the same have been applied, and which may be easily manipulated to either fully or partially release the brakes whenever desired.

I claim:

1. An emergency brake operating device comprising a tubular body mounted for bodily sliding movement and provided with an elongated slot at one side thereof, a stationary rack member positioned in alignment with said slot, a dog mounted within the interior of the tubular body cooperating with the said rack, and an actuating rod mounted for sliding movement longitudinally of said body and projecting within the interior of the body for releasing said dog from the rack.

2. An emergency brake operating device comprising a hollow tubular body provided with a slot at one side thereof, a tubular handle attached to one end of the said body, a stationary rack bar projecting through the said slot, a dog mounted within the interior of the body cooperating with the said rack, and an actuating rod guided for longitudinal movement within the bore of the said handle for releasing the said dog from the rack.

3. An emergency brake operating device comprising a bearing socket, a hollow tubular body provided with a slot at one side thereof mounted for bodily sliding movement in the said socket, a rack bar anchored to the socket and having the teeth thereof projecting through the said slot, a pivoted dog disposed within the tubular body and normally urged into engagement with the rack, a tubular handle attached to one end of the body, and an actuating rod extending through the bore of the handle and guided for longitudinal sliding movement therein, the inner extremity of the said rod operatively engaging the said dog whereby to rock the same and disengage it from the rack.

In testimony whereof, I sign my name

JAMES B. TOPHAM.